US007587485B1

(12) United States Patent
Chitnis et al.

(10) Patent No.: US 7,587,485 B1
(45) Date of Patent: Sep. 8, 2009

(54) SYSTEM AND METHOD FOR SUPPLICANT BASED ACCOUNTING AND ACCESS

(75) Inventors: Sunil P. Chitnis, San Jose, CA (US); Bhimaraju Prasad, Sunnyvale, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 567 days.

(21) Appl. No.: 10/251,459

(22) Filed: Sep. 19, 2002

(51) Int. Cl.
*G06F 15/173* (2006.01)
(52) U.S. Cl. .................. 709/224; 726/17; 709/229; 713/154
(58) Field of Classification Search ................ 709/224, 709/238, 229; 370/463, 252, 235.1, 230.1, 370/229; 726/7, 13, 15, 17; 703/27; 713/150, 713/201, 200, 154
See application file for complete search history.

(56) References Cited

U.S. PATENT DOCUMENTS

| 5,315,580 | A | 5/1994 | Phaal |
| 6,075,769 | A | 6/2000 | Ghanwani et al. |
| 6,091,725 | A | 7/2000 | Cheriton et al. |
| 6,151,316 | A | 11/2000 | Crayford et al. |
| 6,243,667 | B1 | 6/2001 | Kerr et al. |
| 6,308,148 | B1 | 10/2001 | Bruins et al. |
| 6,339,830 | B1 | 1/2002 | See et al. ................ 713/212 |
| 6,363,056 | B1 | 3/2002 | Beigi et al. |
| 6,480,471 | B1 * | 11/2002 | VanZante et al. ............ 370/252 |
| 6,567,379 | B1 * | 5/2003 | Walker et al. ............ 370/235.1 |
| 6,587,432 | B1 * | 7/2003 | Putzolu et al. .............. 370/229 |
| 6,633,835 | B1 | 10/2003 | Moran et al. |
| 6,721,825 | B1 | 4/2004 | Wood |
| 6,874,090 | B2 | 3/2005 | See et al. |
| 6,892,309 | B2 * | 5/2005 | Richmond et al. ............. 726/7 |
| 6,894,972 | B1 | 5/2005 | Phaal |
| 6,920,112 | B1 * | 7/2005 | McCloghrie et al. ........ 370/252 |
| 6,981,052 | B1 | 12/2005 | Cheriton |
| 7,028,337 | B2 * | 4/2006 | Murakawa ................... 726/15 |
| 7,215,637 | B1 * | 5/2007 | Ferguson et al. ......... 370/230.1 |
| 7,225,244 | B2 | 5/2007 | Reynolds et al. |
| 2001/0051865 | A1 | 12/2001 | Kerr et al. |
| 2002/0016858 | A1 * | 2/2002 | Sawada et al. .............. 709/238 |

(Continued)

OTHER PUBLICATIONS

Aboba et al., "Extensible Authentication Protocol (EAP)," Network Working Group Jun. 2004, pp. 1-63 downloaded from http://www.rfc-editor.org/rfc/rfc3748.txt on Nov. 15, 2005.

(Continued)

*Primary Examiner*—Jungwon Chang
(74) *Attorney, Agent, or Firm*—Townsend and Townsend and Crew LLP

(57) ABSTRACT

The method of the present invention comprises initiating a connection to a port on an access device by a supplicant and associating supplicant identification information with the port. The access device may comprise any network connectivity device, including a wireless access point. Data packets transmitted over the port by the supplicant are statistically sampled as they are transmitted, with each of the sample data packets also associated with the supplicant identification information. The sample data packets are stored according to their associated supplicant identification information in order to perform accounting. The sample data packets, with the supplicant identification information, are sent to a network management system where the data is archived and presented in a human readable form, e.g., charts, etc.

28 Claims, 4 Drawing Sheets

U.S. PATENT DOCUMENTS

| | | | |
|---|---|---|---|
| 2002/0133586 A1* | 9/2002 | Shanklin et al. | 709/224 |
| 2002/0165956 A1 | 11/2002 | Phaal | |
| 2003/0110229 A1 | 6/2003 | Kulig et al. | |
| 2003/0126195 A1 | 7/2003 | Reynolds et al. | |
| 2003/0145233 A1* | 7/2003 | Poletto et al. | 713/201 |
| 2003/0169764 A1* | 9/2003 | Lavigne et al. | 370/463 |
| 2003/0200456 A1* | 10/2003 | Cyr et al. | 713/200 |
| 2003/0212907 A1* | 11/2003 | Genty et al. | 713/201 |
| 2004/0054680 A1 | 3/2004 | Kelley et al. | |
| 2004/0257999 A1 | 12/2004 | MacIssac | |
| 2005/0060598 A1 | 3/2005 | Klotz et al. | |

OTHER PUBLICATIONS

Aboba et al., "PPP EAP TLS Authentication Protocal," Network working Group Oct. 1999, pp. 1-23 downloaded from http://www.ietf.org/rfc/rfc2716.txt on Nov. 15, 2005.

Blunk et al., "PPP Extensible Authentication Protocol(EAP)," Network Working Group Mar. 1998, pp. 1-15 downloadeed from http://www.ieft.org/rfc/rfc2284/txt on Nov. 15, 2005.

Claffy et al., "Application of Sampling Methodologies to Network Traffic Characterization,".

"GT-48002A: Switched Fast Ethernet Controller for 100BaseX," Preliminary Rev. Revision 1.2, Aug. 19, 1997 by Galileo Technology.

Jedwab et al., "Traffic estimation for the largest sources on a network, using packet sampling with limited storage," Hewlett Packard (Colorado Telecommunications Division) Management, mathematics and Security Dept., HP Laboratories Bristol, HPL-92-35, Mar. 1992.

"LAN Traffic Management," Hewlett-Packard Company, pp. 81-83, (1994).

MacNally, C., "Cisco LEAP protocol description," pp. 1-4 downloaded from http://list.cistron.nl/pipermail/cistron-radius/2001-September/002042.html on Nov. 15, 2005.

Mills et al., "Internet accounting: Background," Nov. 1991, Network Working Group.

"NetFlow Services and Applications," White Paper, pp. 1-29, Cisco Systems, Inc. (1999).

Phaal et al., "InMon Corporation's sFlow: A Method for Monitoring Traffic in Switched and Routed Networks," Network Working Group Sep. 2001, pp. 1-29 downloaded from http://www.ieft.org/rfc/rfc3176.txt on Nov. 15, 2005.

Postel, J., "Internet Control Message Protocol: Darpa Internet Program Protocol Specification," Sep. 1981, Network Working Group.

Zinky et al., "Visulaizing Packet Traces," BNN Communications, pp. 293-304 (1992).

"IEEE Standard for Local and Metropolitan area networks—Port-Based Network Access Control (standard 802-1X-2001)," pp. i-viii and 1-110 (2001).

"IEEE Standard for Local and Metropolitan area networks—Port Based Network Access Control (revision of standard 802-1X-2001)," cover page, pp. i-vii and 1-169 (2004).

U.S. Appl. No. 10/107,749, filed Mar. 26, 2002, Chitnis et al.

Dave Stevenson and Sandra Duncan, "An Introduction to Novell's Burst Mode Protocol," Mar. 1992, Novell Research.

U.S. Appl. No. 10/882,513, filed Jul. 1, 2004, Prasad.

* cited by examiner

SYSTEM AND METHOD FOR SUPPLICANT BASED ACCOUNTING AND ACCESS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to the following commonly owned patent application which is hereby incorporated by reference herein in its entirety:

U.S. patent application Ser. No. 10/107,749 filed on Mar. 26, 2002, (now abandoned) titled "NETWORK MONITORING USING STATISTICAL PACKET SAMPLING".

BACKGROUND OF THE INVENTION

The invention disclosed herein relates generally to network security and monitoring. More specifically, the invention relates to collecting identifying information to enforce access rights to network destinations for supplicants connecting to a network via an access point and using this identifying information to perform supplicant-based analysis of network traffic.

Over the past several years there has been an extensive proliferation of network access devices through which client terminals may access computer networks, such as the Internet. The vast majority of access points in place today adhere to one form of the Ethernet protocol over a wired or wireless medium. In both wired and wireless environments, network protocol over a wired or wireless medium. In both wired and wireless environments, network access and accounting are critical to protect sensitive network resources and account for the use of those resources by supplicants, e.g., users or end terminals. In this regard, a number of methodologies have been developed in an attempt to secure networks from intruders.

One of the most widespread methodologies for securing access to wireless networks is the Wired Equivalent Privacy (WEP) protocol intended to bring a level of physical security equivalent to that enjoyed by wired local area networks to WLANs. The WEP algorithm involves encrypting data traffic between a device and an access point through the use of a shared key; most administrators rely on a single key shared among an access point and its connected devices. This algorithm, however, comprises a critical flaw allowing decryption of data traffic. Researchers from the Internet Security, Applications, Authentication and Cryptography group (ISAAC) in the Computer Science Division at the University of California at Berkeley have identified a number of successful attacks against the algorithm including: passive attacks based on statistical analysis, active attacks to inject new data traffic from unauthorized mobile stations, active attacks based on tricking an access point and dictionary building attacks that allows real-time automated decryption of data traffic. Information pertaining to WEP vulnerabilities is available at http://www.isaac.cs.berkeley.edu/isaac/wep-faq.html.

Another technique that has been developed for securing access to wired and wireless networks is the set of 802.1X enhancements to the various 802.11 specifications. 802.1X is a technology that is implemented at a network access point to prevent unauthorized access to the resources hosted by the access point. The security protocol used, referred to as the Extensible Authentication Protocol, handles the interaction between the access point and supplicant to obtain identification information that is validated by an authentication server. To date, however, this technology has not implemented any type of functionality that allows a user, such as a network administrator, to monitor or analyze the data traffic on a per-supplicant basis.

Modern networking environments provide enormously enhanced data transmission capabilities over environments available only a few years ago. At the same time, an increasing number of network service providers and users need to be able to monitor network traffic and use. In order to resolve the conflict between the escalating amount of network traffic and the increased need for monitoring, efficient, accurate, and inexpensive methods of statistical packet sampling have been developed. As indicated, however, network monitoring methodologies have not implemented functionality to monitor users as they connect to access points and control the transmission of data packets.

There is thus a need for a system, method and article of manufacture whereby identification information may be collected for a supplicant connected to a given port on an access device to selectively prevent or allow access to network resources, the identification information further used to associate the supplicant identification information with sample data packets selected from monitored data traffic in order to perform supplicant based analysis.

BRIEF SUMMARY OF THE INVENTION

The present invention provides a network configuration protocol and algorithm which resolves deficiencies with prior protocols. According to one embodiment, the invention comprises a method for performing supplicant based network accounting and access control. The method comprises initiating a connection to a port on an access device by a supplicant, which may comprise a user or any end user terminal, and associating supplicant identification information for the supplicant with the port. The access device may comprise any network connectivity device, including a wired or wireless access point. Data packets transmitted over the port by the supplicant are statistically sampled as they are transmitted, with each of the sample data packets also associated with the supplicant identification information.

The present invention is suited to performing accounting and access in wired or wireless transmission environments and may comprise initiating communications between a supplicant and an access device according to the 802.11 specification for wireless communication, although other communication protocols may be implemented. For example, communication according to the 802.11 specification may comprise communication according to the 802.11, 802.11a, 802.11b and 802.11g specifications.

According to certain embodiments, the supplicant identification is requested from the supplicant. The exchange of supplicant identification information may be conducted according to the 802.1X specification. Accordingly, validating the supplicant may be accomplished by comparing the supplicant identification information with information regarding the supplicant stored in a data store. The process of validation determines whether a supplicant may access a network. One embodiment contemplates conducting the validation process according to the RADFUS protocol.

The method of the present invention also comprises receiving data packets from the supplicant over the port and associating the supplicant identification information with the packets. An analysis is performed to determine a source, destination and the supplicant identification information associated with the packets to conclude whether the supplicant has permission to access the destination. This determination is used to selectively block access to the destination.

One benefit of the present invention is the ability to monitor and analyze network traffic on a per supplicant basis. In this regard, the present invention contemplates analyzing the sample data packets according to the supplicant identification information associated with the sample data packets. Analyzing may comprise calculating an historical analysis over a given time range of the sample data packets according to the supplicant identification information associated with the sample data packets. Alternatively, analyzing comprises calculating an instantaneous analysis of the sample data packets according to the supplicant identification information associated with the sample data packets.

The present invention also comprises a system for performing supplicant based network accounting. The system of the present invention comprises an access device comprising one or more ports to which one or more supplicants may connect, the access device further providing a communications path to a network. According to the specific implementation of the invention, the access device itself may comprise the entire network. An authentication module is provided that implements functionality to validate supplicant identification information provided by the one or more supplicants. A network monitor module samples data packets transmitted by a given supplicant of the one or more supplicants over a given port of the one or more ports and associates identification information for the given supplicant with the sample data packets collected by the network monitor module from traffic transmitted by the given supplicant over the given port.

The system also comprises a client authentication module executing on the given supplicant. The client authentication module is operative to communicate the supplicant identification information upon request. According to one embodiment, the client authentication module communicates according to the EAP protocol An access control module is operative to receive a data packet from the given supplicant, analyze a source, destination and the supplicant identification information, determine whether the supplicant has permission to access the destination, and selectively block access to the destination based on the determination. This may be supported by an EAP module operative to request the supplicant identification information according to the EAP protocol and an authentication module operative to verify the supplicant identification information against a set of authentication and access data. Advantageously, the access control module may be implemented as a component of the access device. Likewise, the network monitor module may be implemented as a component of the access device in order to create a unified device that thereby conserves space and power resources.

As explained previously, one benefit of the present invention is the ability to monitor and analyze network traffic on a per supplicant basis. The network monitor module may statistically sample data packets transmitted by a given supplicant over a given port on the access device. According to one embodiment, the network monitor module statistically samples data packets transmitted by a given supplicant over a given port on the access device according to the sFlow protocol defined in RFC 3176.

A network management module of the present invention may store and analyze the sample data packets according to the given supplicant identification information associated with the sample data packets. The network management module may also calculate an historical analysis over a given time range of the sample data packets according to the given supplicant identification information associated with the sample data packets. Alternatively, the network management module calculates an instantaneous analysis of the sample data packets according to the given supplicant identification information associated with the sample data packets.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Embodiments of a method, system, and article of manufacture comprising software programs for processing identification information for a supplicant connected to a given port on an access point to selectively prevent access to network destinations and associating the supplicant identification and access control status information with monitored data traffic in order to perform advanced analysis of network traffic in accordance with the present invention are described with reference to the drawings in FIGS. 1 through 4.

Figure 1:
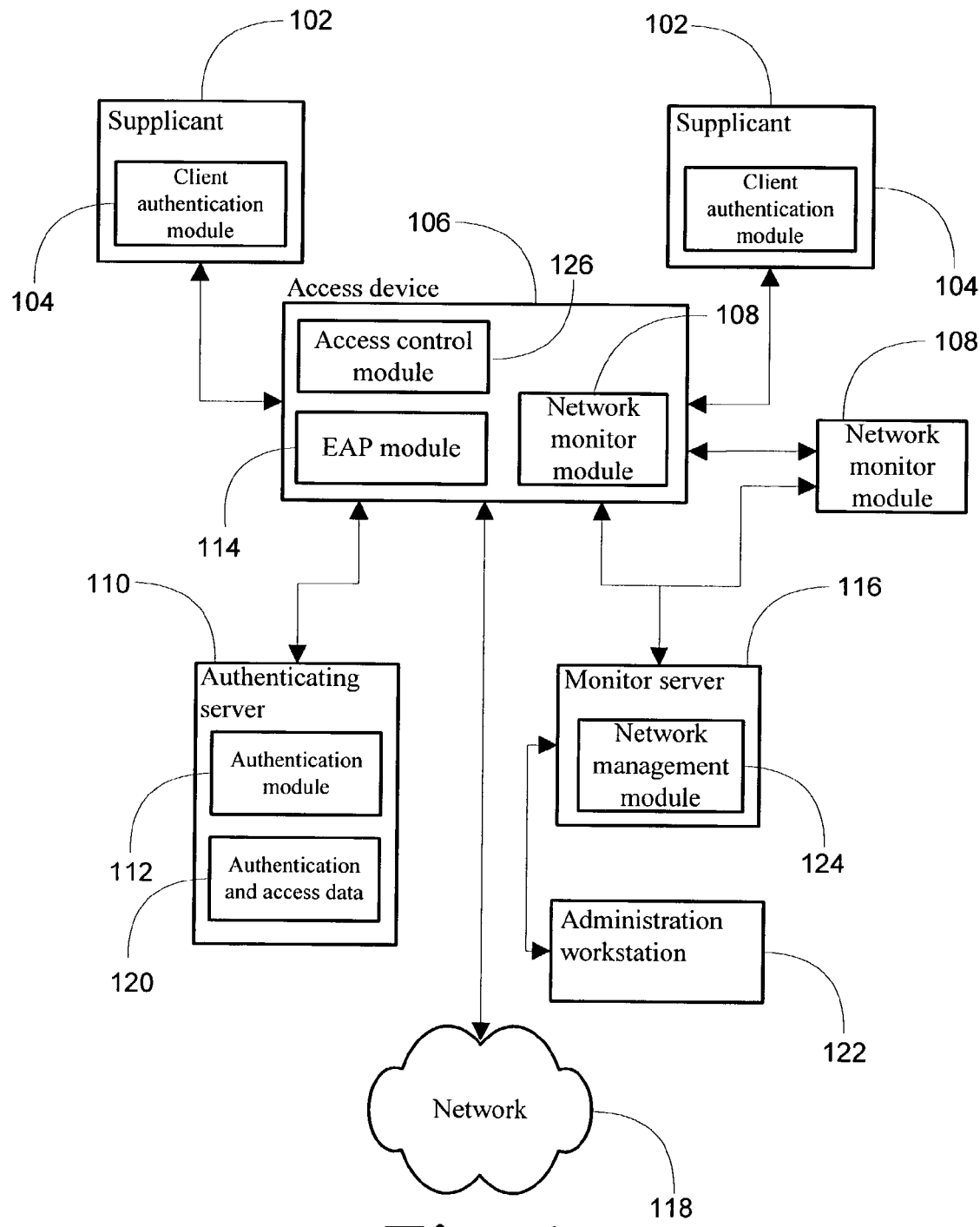
FIG. 1 is a block diagram presenting a configuration of hardware and software components for controlling access to network resources and performing supplicant based network monitoring according to one embodiment of the present invention.

Turning to FIG. 1, hardware and software components configured according to one embodiment of the present invention are illustrated. The network comprises a number of client devices 102, referred to as supplicants, which communicate with an access device 106. The supplicant communicates with the access device, which may comprise a wired or wireless access point, to achieve connectivity to a network 118. According to some embodiments, a supplicant comprises either a user configured on an end station or an end station itself, such as a client terminal. The supplicant 102 may further comprise any type of general purpose computing device, such as a personal computer or personal digital assistant that comprises hardware and/or software that allows it to maintain a connection to the access device 106, such as a client authentication module 104, in addition to other hardware and software components (not pictured) that are well known to those of skill in the art.

The supplicant 102 maintains a client authentication module 104, which is a software component that allows it to implement the 802.1X enhancements. The 802.1X enhancements allow a central authority to authenticate the supplicant 102, such as by an authentication module 112 residing on an authentication server 110. 802.1X uses the Extensible Authentication Protocol (EAP) for exchange of control packets during the authentication process. The use of other authentication protocols, however, may be implemented in conjunction with the present invention, one example being LEAP from Cisco Systems, which is described at http://lists.cistron.nl/pipermail/cistron-radius/2001-September/002042.html and incorporated herein by reference. Other protocols that are well known to those of skill in the art may alternatively be utilized for the exchange of control packets during the authentication process.

The supplicant 102 connects to the access device 106, which initially places the given port over which the supplicant 102 is connecting into an unauthorized state. In this unauthorized state, the access device only permits the supplicant to transmit control packets, e.g., EAP authentication packets. A port in an unauthorized state also prevents the transmission of normal data traffic.

The supplicant 102 uses its client authentication module 104 to generate a control packet comprising a start request that is transmitted to the access device 106 to start the authentication process. The access device 106 receives the control packet, which is processed by an EAP module 114 responsible for controlling the state of ports on the access device 106. According to various embodiments, the EAP module 114 may be replaced with one or more alternative software or hardware components used to implement a given authentication protocol used at the access device 106. The EAP module 114 may be implemented in software and executed by the access device 106 or an external device. Based on the receipt of a control packet to start the authentication process, the EAP module 114 generates and issues a control packet back to the supplicant 102 requesting supplicant identification information.

The supplicant 102 transmits a response to the access device 106 that provides the supplicant identification information. The supplication identification information may include, but is not limited to, a supplicant username, password, and address information, e.g., an Internet Protocol (IP) or Media Access Control (MAC) address for the supplicant. The control packet comprising the supplicant identification information is received by the access device 106 and passed to the EAP module 114, where the identification information is extracted and stored.

The EAP module 114 also encapsulates the supplicant identification information into an authentication packet that is passed to an Authentication, Authorization and Accounting (AAA) subsystem that includes an authentication server 110, the EAP module 114 also comprising a component of the AAA subsystem. The AAA subsystem refers to a framework for intelligently controlling access to computer resources, enforcing policies, auditing usage and providing information necessary to bill for services, which are important for effective network management and security. An authentication module 112 performs these services, which may be implemented in various combinations of hardware and software, executed on an authenticating server 110. According to one embodiment of the invention, the authenticating server 110 implements the Remote Authentication Dial-In User Service (RADIUS) protocol that enables remote access servers, e.g., an access device 106, to communicate with a central server to authenticate supplicants and authorize access to a requested system or service.

The EAP module 114 on the access device 106 passes the supplicant identification information in the authentication packet over a network, which may also be a combination of wired and wireless networks, to the authenticating server 110 for authentication by an authentication module 112. Alternatively, the access device 106 may execute the authentication module 112. The authentication module 112 is provided with access to a set of authentication and access data 120 that is used by the authentication module 112 to authenticate the supplicant 102 based upon the received supplicant identification information. A data store may be used to maintain the authentication and access data 120, for example, a flat file data structure, such as a tab or comma delimited data file, a relational database, an object-oriented database, a hybrid relational-object database, or other data stores well known to those of skill in the art.

The authentication module 112 parses the authentication packet to isolate its constituent parts, e.g., the supplicant's username and password. The authentication module 112 performs a lookup on the authentication and access data 120 to determine whether the supplicant is authorized to access the network 118 via the given port that the supplicant 102 is connecting to at the access device 106. As is well known to those of skill in the art, the authentication module 112 may use any number of authentication algorithms to authenticate the supplicant 102. Based on the analysis performed at the authentication module 112 on the supplicant identification information and other information in the authentication packet, a message comprising a "pass" or "fail" value is transmitted back to the access device 106. According to another embodiment, the authentication module 112 receives only a supplicant's username or end station identifier and issues a challenge packet to the access device 106 in response, which is forwarded to the supplicant 102. In response, the supplicant 102 sends a challenge response comprising a password within an EAP frame for transmission to authentication module 112. Based on this information, e.g., username and password, the authentication module 112 calculates a "pass" or "fail" response for the access device 106.

The EAP module 114 on the access device 106 parses the received message from the authentication module 112 to determine its contents. If the message comprises a value of pass, the access device 106 transitions the given port to which the supplicant 102 is connecting to an authorized state, thereby allowing normal data traffic to pass through the port. Where the message comprises a fail value, the access device 106 transitions the port to an unauthorized state and the supplicant 102 is prevented from accessing the port. Normal data traffic is therefore unable to be transmitted to the network 118.

An access control module 126 is provided to selectively deny access to network resources 118. Destination information contained within any given data packet is combined with knowledge regarding the identity of the supplicant 102 transmitting the data packet as described herein. The access control module 126 determines if the supplicant 102 is permitted to access the destination to which the data packet is being transmitted. An access control list, which may be maintained within the authentication and access data 120, comprises permitted destinations that may be accessed by a given supplicant 102. For example, the access control list used by the access control module 126 may indicate that the supplicant 102 identified as "John Doe" is allowed to access IP addresses in the range of 150.100.100.1 through 150.100.100.50. More complex access rules may be defined, including the use of conditional statements and any other data that defined a given data packet's parameters Where the access control module 126 determines that the supplicant 102 is not authorized to transmit the data packet to its intended destination, the data packet is stopped and an error code is issued indicating the status. The error code may comprise detailed information regarding why the packet was not propagated to its intended destination. For example, where the supplicant 102 is attempting to transmit a data packet to a destination MAC address to which it is unauthorized to do so, the access control module 126 may present this information on the supplicant's output device (not pictured), such as a video display. Where the access control module 126 determines that the supplicant 102 is authorized to transmit the data packet to the destination contained therein, the data packet is allowed access and is propagated to the destination address. This status information may be passed to the network monitor module for inclusion with sample data packets as described in greater detail herein.

As described above, the EAP module 114 extracts and stores a copy of the supplicant identification information. When the authentication module 112 validates the supplicant 102 to access the network 118 over the given port on the access device 106, the network monitor module 108 associates the supplicant identification information with sample data packets collected from data traffic passed by the supplicant 102 over the given port. According to one embodiment, packets comprising data traffic passed over the given port by the supplicant 102 are modified to include the supplicant identification information.

The system of the present invention also comprises a network monitor module 108 and a network management module 124 to monitor and analyze network traffic passed over ports comprising the access device 106. The network monitor module 108 may be executed as a software process on the access device 106 or may be executed on a separate server in communication with the access device 106. The network management module 124 is executed on a monitor server 116, which provides sufficient persistent and transient memory resources to maintain raw and analyzed sample network traffic. Alternatively, the network monitor module 108 and network management module 124 may be implemented in a combination of hardware and software on one or more devices. The modules 108 and 124 may implement a structure and operation as is disclosed in extensive detail in U.S. patent application Ser. No. 10/107,749 filed on Mar. 26, 2002, (now abandoned), titled "NETWORK MONITORING USING STATISTICAL PACKAGE SAMPLING," said application incorporated by reference herein in its entirety.

The network monitor module 108 performs sampling of data traffic passed over ports on the access device 106, which may comprise statistical sampling, e.g., according to the sFlow protocol defined in RFC 3176. The sample data packets are used to allow a network administrator to achieve a picture of how supplicants 102 are utilizing the network 118. It will be noted by those of skill in the art that according to certain embodiments, the access device 106 comprises the entire network 118. As the network monitor module 108 collects sample data packets from network traffic received over ports on the access device 106, the supplicant identification information maintained by the EAP module 114 is used to associate sample data packets taken from traffic on a given port with the identity of the supplicant 102 generating the traffic.

The network monitor module 108 receives a sample data packet from the underlying device hardware, e.g., the access device 106, and examines the sample data packet to determine its source port. Based on the source port for the received sample data packet, the network monitor 108 retrieves the supplicant identification information and adds extended "source supplicant" data to the sample data packet to identify the supplicant 102 that is the source of the sample data packet. Alternatively, where the sample data packet is destined for an 802.1X or similarly enabled port, the network monitor module 108 incorporates extended "destination supplicant" data to the sample packet to identify the supplicant 102 that is the destination for the packet. The network monitor module 108 exports the sample data packets, which now comprise the supplicant identification information, to the network management module 124 for analysis.

According to embodiments of the invention, the network monitor module 108 comprises an integrated circuit, such as an application specific integrated circuit (ASIC) or field programmable gate array (FPGA), for performing packet sampling. The sampling circuit includes a counter to determine whether a sample packet should be generated for a particular received packet. If a sample packet is to be generated for a particular received packet, logic in the sampling circuit alters the packet header. The packet is sent to a buffer, a buffer manager is notified of the location of the packet in the buffer and that the packet has been selected for sampling. The buffer manager schedules the received packet for routing, as well as to be sent to the CPU as a sample packet. A number generator may be included to generate a skip number equal to the number of packets to skip before generating the next sample packet.

The network management module 124 parses received sample data packets to record packet parameters. The parsed packets may be stored in a memory, for example, a database, either as received or using a data compression scheme such as assigning a unique key to a given set of packet parameters. Exemplary sample data packet parameters may include a VLAN ID, a source IP address, a destination IP address, a source MAC address, a destination MAC address a BGP autonomous system value, an application identifier, and a packet size, in addition to other sample data packet parameters. Each sample data packet is associated with at least the supplicant identification information for the supplicant 102 that generated the packet. Preferably, destination supplicant identification information is maintained as well for each sample packet where the destination port enables 802.1X functionality.

A network or system administrator may access the network management module 124 using an administration workstation 122 to view the raw or analyzed sample packet data that is maintained by the network management module 124. According to certain embodiments, the network management module 124 comprises the administration workstation 122. The administration workstation 122 may be any general purpose personal computer comprising a communication pathway to the network management module 124. The network management module 124 enables the administrator to monitor instantaneous network traffic or view historical reports. For example, based on the stored sample packet data, the administrator may request the network management module 124 to present the top IP pair, the top MAC pairs or the top VLAN pairs over a given period.

The network monitor module may also be used to identify the top "talkers" communicating over the access device 106, for example, the two supplicants transmitting the most frames, bandwidth, or otherwise consuming the most bandwidth. Likewise, the network management module 124 is capable of presenting the converse information, such as bottom IP or MAC address pairs. Alternatively, the administrator may use the administration workstation 122 to obtain an instantaneous analysis of any given supplicant's traffic being analyzed by the network management module 124. An administrator may program or otherwise configure the network management module 124 to provide custom reporting based on desired sample packet parameters.

Another useful function of the network management module 124 is the ability to instruct the access device 106 to limit the amount of bandwidth allocated to a given port on the access device 106. For example, where the sample data packets analyzed by the network management module 124 identify a particular supplicant 102 that is utilizing a disproportionate amount of bandwidth on a given port, a control packet may be transmitted to the access device 106. The control packet identifies the given port to which the supplicant 102 is connected and an instruction to limit the total bandwidth that the access device 106 is allocating to the port, which is acted on accordingly by the access device 106.

Figure 2:
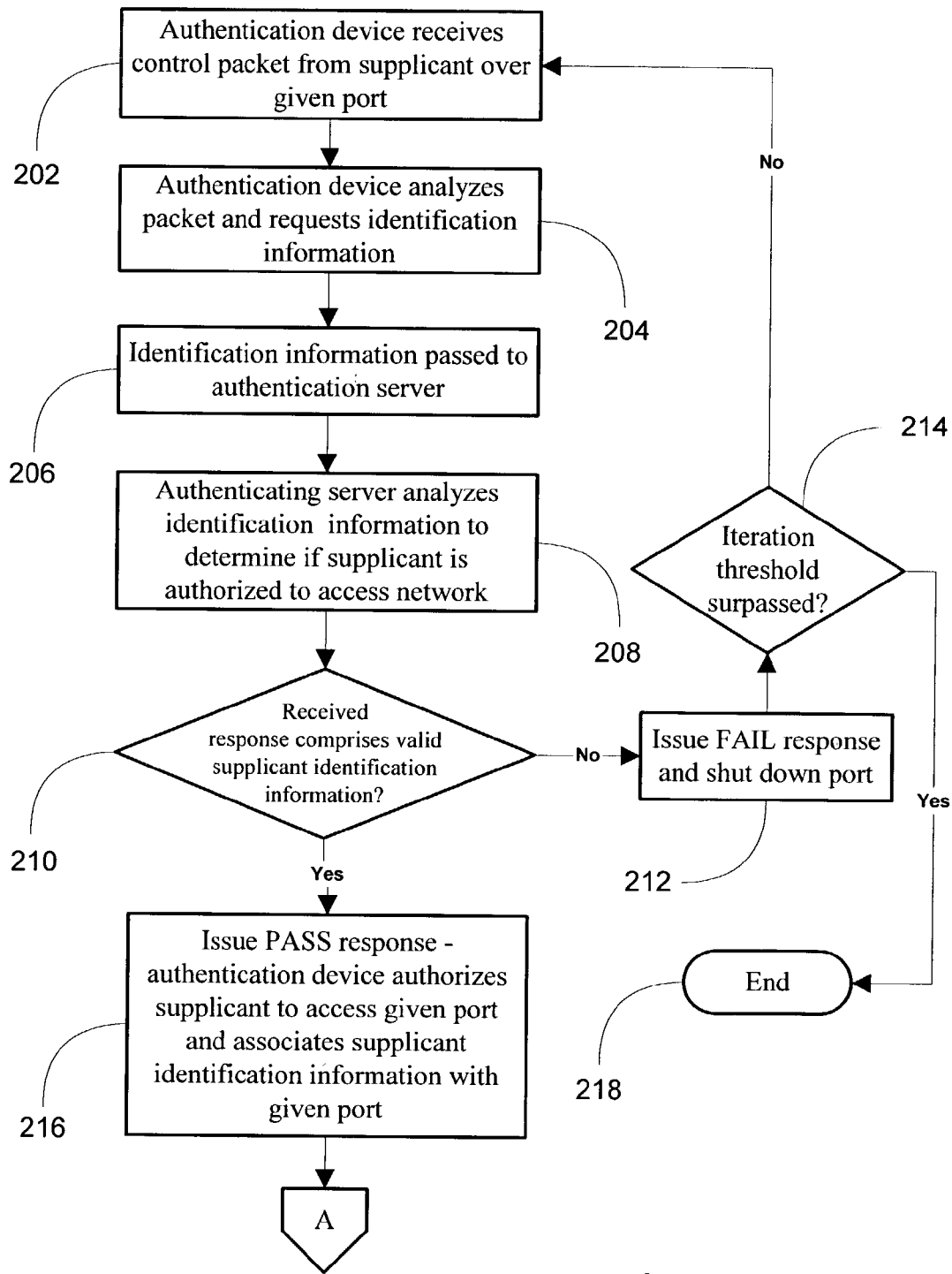
FIG. 2 is a flow diagram presenting a process for connecting to an access device and verifying the identity of a supplicant connected to a given port according to one embodiment of the present invention.

FIG. 2 is a flow diagram presenting one embodiment of a method for validating a supplicant to access a network within the context of the system illustrated in FIG. 1. Supplicants wishing to access network resources through an access device, for example, a wired or wireless access point, typically use client side software to locate and access the access device. When a supplicant identifies an appropriate access device that provides a route to a desired network or network resource, the supplicant transmits a control packet, such as an EAP start packet, that is received by the access device over a given open port to initiate the authentication process, step 202. When the supplicant initially connects to the access device, control software resident on the access device, such as an EAP module, sets the port to an unauthorized state, which allows the supplicant to only pass control packets over the port until the supplicant is validated.

The access device analyzes the control packet to identify it as an initiating control packet, e.g., the supplicant wishes to initiate a connection over the port that control packet was received, step 204. In response to receipt of the control packet, the access device requests identification information from the supplicant. Upon receipt of the identification information request, client software operating on the supplicant, such as a client authentication module, accesses client side data that comprises the identification information, which the supplicant places in a response control packet for transmission back to the access device, step 206. Alternatively, the supplicant may remotely access its identification information. According to various embodiments, the supplicant identification information includes, but is not limited to, a username, a password, an IP address, a MAC address, the port that the supplicant is attempting to connect to on the access device, and the VLAN that the supplicant is attempting to connect to on the access device.

The control packet comprising the supplicant identification information is passed to the access device over the port to which the supplicant is attempting to connect, step 206. The access device receives the control packet and passes it to an authentication server for validation. The authentication sever executes an authentication module, implemented in software or hardware, to analyze the supplicant identification information and determine whether the supplicant is entitled to access the network, step 208. The authentication module may use any number of algorithms that are well known to those of skill in the art to validate the identification information. For example, the authentication module may implant the RADIUS standard that allows remote devices such as the access device to validate supplicants. The authentication module obtains the supplicant's identification information from sources including, but not limited to, a system database such as a supplicant's login and password information stored in the password file on a typical UNIX system, with an internal database maintained by the authentication module, a SQL or other type of database sever, or via a PAM (Pluggable Authentication Module) framework.

A check is performed to determine if the identification information provided by the supplicant in the control packet matches identification information maintained or retrieved by the authentication module, step 210. Where the supplicant identification information contained in the control packet cannot be validated by the authentication module, step 210, a response control packet comprising a "fail" response is generated, step 212. The response packet is passed to the access device for transmission to the supplicant and the port is shut down.

A check is performed to determine if number of times the supplicant has attempted to connect to the access device in the current session has exceeded a threshold, step 214, which may be set by a system administrator. The threshold analysis may be accomplished, for example, by examining a port identifier contained in the control packets indicating the port to which the supplicant is attempting to connect, maintaining this information in a data store, and incrementing a counter each time the supplicant attempts to connect in a given session until the counter reaches a threshold. Where the threshold has not been reached, step 212, program flow returns to step 202 where the supplicant attempts to connect to the port on the access device. If the number of connection attempts performed by the supplicant reaches the threshold, the session is terminated and the supplicant is denied access to the network via the access device, step 218.

Where authentication module determines that the supplicant identification information contained in the control packet is valid, step 210, a control packet comprising a "pass" response is generated, step 216. The response packet is passed to the access device where the supplicant identification information is associated with the port over which the supplicant is connecting. The access device also transitions the port into an authorized state to thereby allow normal network traffic to pass over the port.

Figure 3:
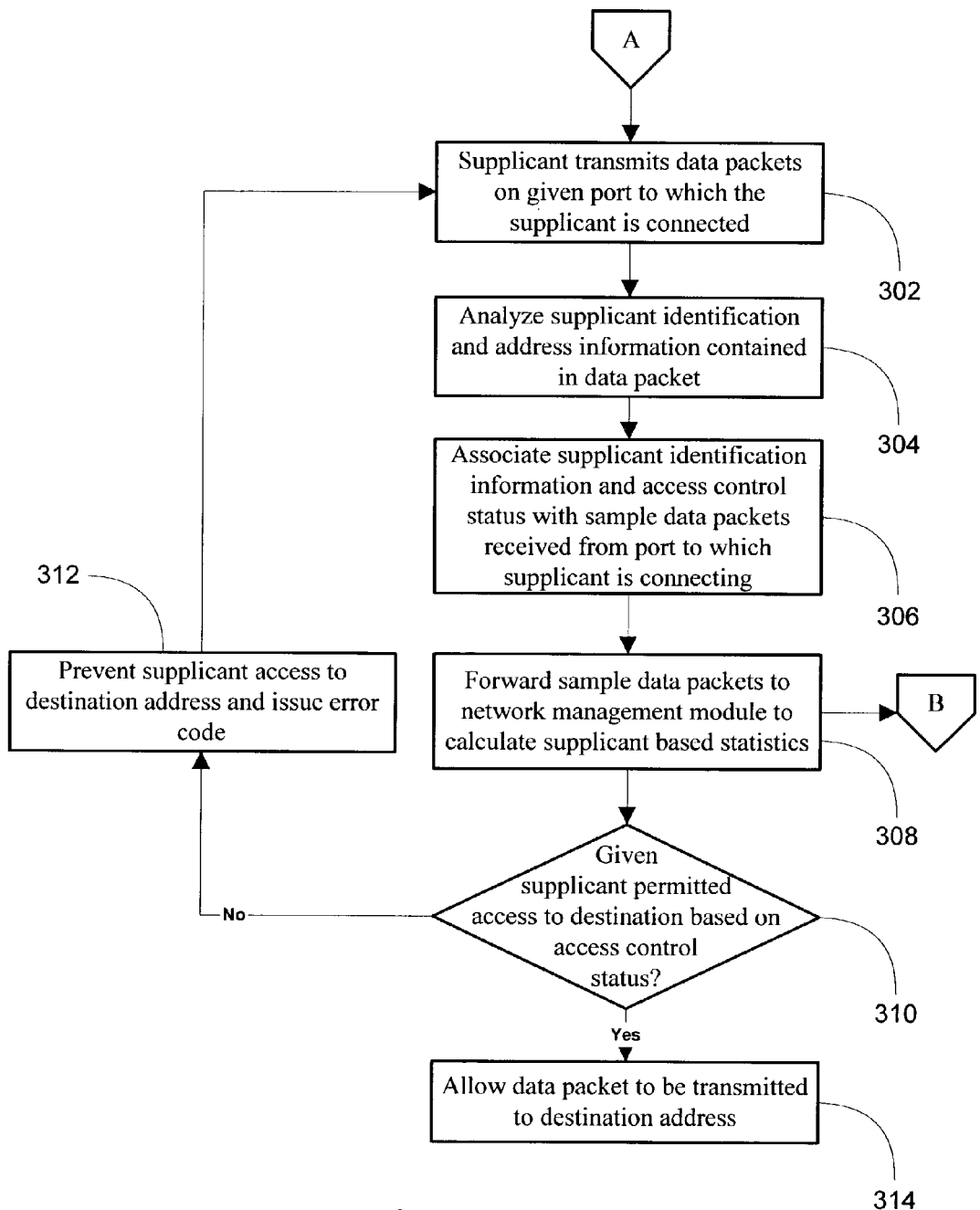
FIG. 3 is a flow diagram presenting a process for associating supplicant identification information with data packets transmitted on a given port and selectively preventing access to network destinations according to one embodiment of the present invention.

Processing continues with FIG. 3, which illustrates one embodiment of a method for monitoring traffic and managing access to network destinations on a per supplicant basis. The port on the access device to which the supplicant is connecting transitions to an authorized state and the supplicant begins to transmit data traffic, e.g. data packets, over the given port, step 302. At the access device, the supplicant identification information is associated with sample data packets that are collected from data traffic that the supplicant is transmitting over the port, step 304. According to one embodiment of the invention, the network monitor module statistically calculates the rate at which sample data packets are copied from the data traffic according to methodology disclosed in previously incorporated U.S. application Ser. No. 10/107,749 filed Mar. 26, 2002 (now abandoned), and wherein the sample data packets are sFlow packets and the network monitor module comprises the hardware and software components of the system disclosed therein.

Destination information is contained within any given data packet, for example, the destination MAC or IP address of a data packet. This information is further combined with knowledge regarding the identity of the supplicant transmitting the data packet to determine who is sending a data packet to a given destination on the network, step 304, thereby generating an access control status value. Furthermore, where the destination is connected to a port where the destination supplicant is identified, a "to-from" analysis may be performed on a per-supplicant basis. According to one embodiment, this information is passed to the access control module for analysis.

The system associates received supplicant identification and access control status information from each supplicant with the port on the access device to which the supplicant is connecting, step 306. Because the system knows the identity of each connected supplicant, it is capable of associating a supplicant's identity with the sample data packets copied from the network traffic passing over each port. The sample data packets are forwarded to the network management module and detailed statistics are compiled regarding the data traffic on each port based on the identity of the supplicant that is generating the traffic, step 308. According to one embodiment, the network monitor module is passed the supplicant identification information, e.g., from an EAP module, and associates the identification information with the sample data packets. As described above, the system can be configured to calculate a number of historical or instantaneous statistical reports regarding the traffic that it is monitoring including, but not limited to, the top IP pairs, the top MAC pairs, and the top VLAN pairs in conjunction with associated supplicant identification information.

In addition to generating sample data packets and performing supplicant based statistical analysis, step 308, the system performs network access control. A check is performed to determine if the supplicant is permitted to access the destination to which the data packet is being transmitted based on the access control status, step 310. A data store may be provided that comprises permitted destinations that may be accessed by a given supplicant, e.g., access control lists. For example, the data store may indicate that the supplicant identified as "John Doe", is allowed to accesses addresses in the range of 152.100.100.1 through 150.100.100.50. More complex access rules may be defined including the use of conditional statements in conjunction with any data that defines a given packet's parameters.

The access control module determines if the supplicant associated with the received data packet is permitted to transmit the data packet to the destination address based on the access control status, step 310. If the calculation determines that the supplicant is not authorized to transmit the data packet, supplicant is prevented from performing the transmission and an error code is issued, step 312. The error code may comprise extended information resulting from the calculations performed as part of the analysis, steps 308 and 310. For example, where the supplicant is attempting to transmit a data packet to a destination MAC address to which it is unauthorized to do so, the system may present this information on the supplicant's output device, such as a video display. Where the calculation determines that the supplicant is authorized to transmit the data packet to the destination address contained therein, step 310, the data packet is allowed access and is propagated to the destination address, step 314.

Figure 4:
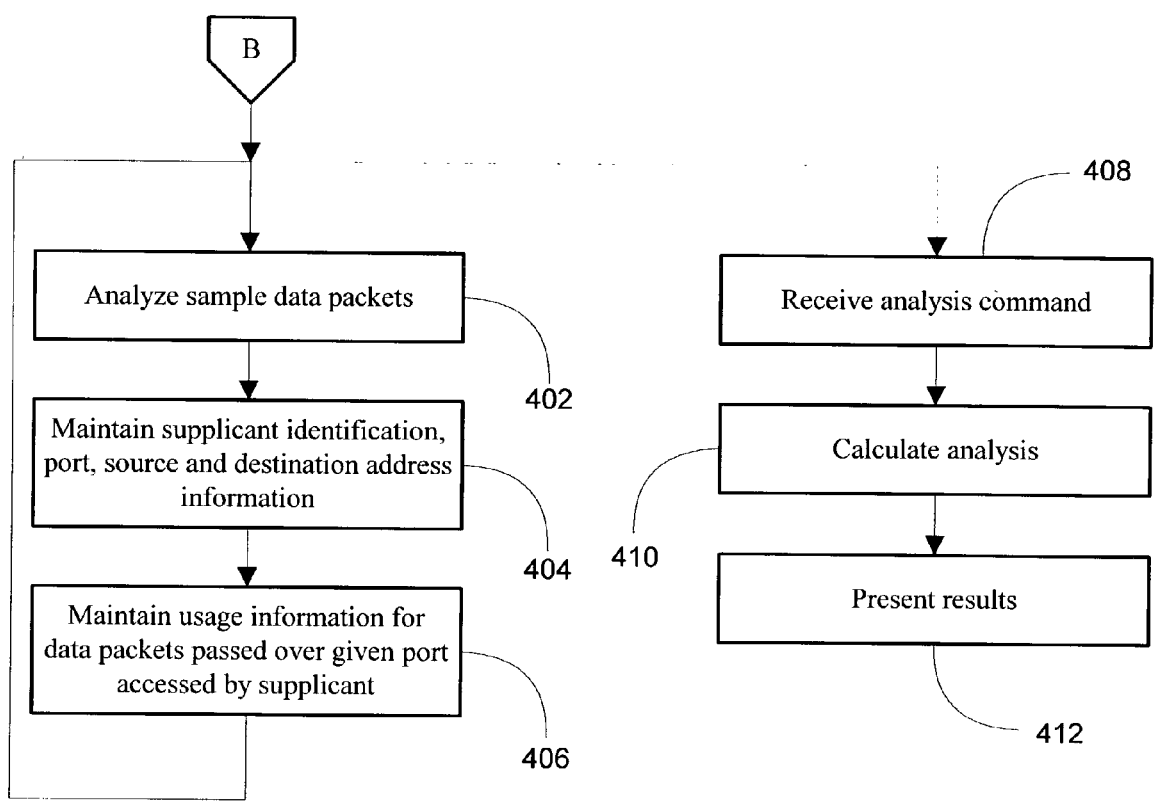
FIG. 4 is a flow diagram presenting a process for analyzing supplicant identification information associated with sample data packets collected from monitored network traffic on a given port according to one embodiment of the present invention.

One embodiment of a method for calculating supplicant based monitoring and accounting on sample data packets that are associated with supplicant identification information is presented in FIG. 4. As indicated in step 306 of FIG. 3, the network management module calculates supplicant based analysis on sample data packets, step 402, which according to one embodiment are sFlow packets. Because sample data packets may be generated statistically, a process of extrapolation may be applied to extrapolate actual traffic metrics. Each of the plurality of sample data packets, in addition to standard information comprising a data packet, also comprises supplicant identification information to thereby allow the sample to be correlated with a supplicant. The sample data packets are parsed and its parameters are maintained in a data store so that they may be analyzed by a network management module, which may present the maintained data historically or instantaneously, step 404. Exemplary parameters that may be maintained include, but are not limited to, the supplicant identification information, the source and destination information, and the port to which the supplicant is connected. The network management module also maintains usage information for the packets that are passed over the given port that the supplicant is accessing, step 406, for example, the number of packets transmitted over the port or the amount of bandwidth that the supplicant is using or has used.

Using software executing on an administration workstation, or software that is remotely executed by the administration workstation, an administrator may issue commands to the network management module to perform analyses on the sample data packets that are maintained by the module, step 408. In addition to analysis commands, the administrator may issue additional management commands to the network management module, for example, rate limiting commands whereby the network management module limits the amount of bandwidth allocated to a supplicant or given port on the access device. Alternatively, the network management module limits the amount of bandwidth allocated to a supplicant or given port on the access device based on the analysis performed on the sample data packets that are maintained by the module.

Based on the command, the network management module performs a responsive analysis, step 410. For example, sample data packets may be analyzed or evaluated according to parameters such as VLAN ID, source IP address, destination IP address, source MAC address, destination MAC address, VLAN membership, transmitting supplicant identification information and receiving supplicant identification information. The results of the analysis are presented to the administrator on the administration workstation, step 412. When viewing the top supplicant or address pairs, the administrator may have the option of viewing a list of address pairs with a numerical value representing the number of transactions between the pairs. Alternately, the administrator may have the option of viewing a graph, with the x-axis representing the address pairs and the y-axis representing the number of transactions between the address pairs. Furthermore, the display may be continually updated as additional sample data packets are processed and stored, steps 402, 404 and 406.

Although certain aspects of the system presented herein have been described as implemented in hardware or software, persons skilled in the art understand that different implementations are possible. For example, program steps stored on a memory and executed by a process of a computer may instead be programmed into an integrated circuit. Conversely, functions that are implemented in hardware may instead be implemented partially or wholly in software. Such variations of implementation are contemplated by and within the scope of the present invention.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for performing network accounting, comprising:
receiving supplicant identification information from a supplicant, the supplicant identification information identifying the supplicant and received during validation of the supplicant to determine whether the supplicant is authorized to use a port of an access device to which the supplicant is connected;
associating the supplicant identification information with the port;
sampling data packets transmitted by the supplicant over the port; and
associating the supplicant identification information with the sample data packets, wherein the associating comprises modifying the sample data packets to include the supplicant identification information.

2. The method of claim 1 comprising initiating a connection to the port according to an 802.11 specification.

3. The method of claim 1 comprising requesting the supplicant identification information.

4. The method of claim 3 wherein requesting the supplicant identification information is conducted according to the 802.1X specification.

5. The method of claim 1 comprising validating the supplicant by comparing the supplicant identification information with information regarding the supplicant stored in a data store.

6. The method of claim 5 wherein validating comprises determining whether a supplicant may access a network.

7. The method of claim 6 wherein validating is conducted according to RADIUS protocol.

8. The method of claim 1 comprising:
receiving a data packet from the supplicant over the port;
associating the supplicant identification information with the data packet;
analyzing a source, destination and the supplicant identification information associated with the data packet to generate an access control status value, the access control status value associated with the data packet;
selectively blocking access to the destination based on the access control status value.

9. The method of claim 1 comprising analyzing the sample data packets according to the supplicant identification information associated with the sample data packets.

10. The method of claim 9 wherein analyzing comprises calculating an historical analysis over a given time range of the sample data packets according to the supplicant identification information associated with the sample data packets.

11. The method of claim 9 wherein analyzing comprises calculating an instantaneous analysis of the sample data packets according to the supplicant identification information associated with the sample data packets.

12. The method of claim 1 wherein sampling comprises statistically sampling data packets transmitted by the supplicant over the port.

13. The method of claim 12 wherein statistically sampling comprises sampling according to the sFlow protocol.

14. The method of claim 1 wherein the supplicant is a user.

15. The method of claim 1 wherein the supplicant is a terminal.

16. A method of enabling network monitoring, the method comprising:
receiving information identifying a supplicant, the information identifying the supplicant received during validation of the supplicant to determine whether the supplicant is authorized to use a port of an access device to which the supplicant is connected;
receiving a set of data packets via the port;
generating a set of one or more sample packets for one or more data packets from the set of data packets received via the port; and
associating each sample packet in the set of sample packets with information identifying the supplicant, wherein the associating comprises modifying the sample data packet to include the information identifying the supplicant.

17. The method of claim 16 wherein receiving information identifying the supplicant comprises receiving the information identifying the supplicant using 802.1X protocol.

18. The method of claim 16 wherein the one or more data packets are selected from the set of data packets using statistical sampling.

19. The method of claim 16 wherein the statistical sampling is performed according to a sFlow protocol.

20. The method of claim 16 further comprising:
analyzing the set of sample packets based upon the information identifying the supplicant associated with the set of sample packets.

21. The method of claim 20 wherein the analyzing comprises:
parsing a sample packet from the set of sample packets to extract a packet parameter.

22. The method of claim 21 wherein the packet parameter is at least one of a VLAN identifier, a source IP address, a destination IP address, a source MAC address, a destination MAC address, a BGP autonomous system value, an application identifier, VLAN membership, transmitting supplicant information, receiving supplicant information, or a packet size.

23. The method of claim 20 further comprising:
limiting a bandwidth amount allocated to the supplicant for the port based upon the analyzing.

24. The method of claim 16 wherein the supplicant is a user.

25. The method of claim 16 wherein the supplicant is a computing device.

26. The method of claim 16 wherein the information identifying the supplicant comprises at least one of a username, a password, or address information for the supplicant.

27. The method of claim 16 wherein the port on the access device provides access to a network.

28. An access device comprising:
a port configured to
receive information identifying a supplicant, the information identifying the supplicant received during validation of the supplicant to determine whether the supplicant is authorized to use the port, and
receive a set of data packets from the supplicant; and
a module configured to
generate a set of one or more sample packets for one or more data packets from the set of data packets received via the port, and
associate each sample packet in the set of sample packets with information identifying the supplicant by modifying the sample data packet to include the information identifying the supplicant.

* * * * *

UNITED STATES PATENT AND TRADEMARK OFFICE
CERTIFICATE OF CORRECTION

PATENT NO. : 7,587,485 B1  
APPLICATION NO. : 10/251459  
DATED : September 8, 2009  
INVENTOR(S) : Chitnis et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1180 days.

Signed and Sealed this

Twenty-first Day of September, 2010

David J. Kappos  
*Director of the United States Patent and Trademark Office*